United States Patent Office 3,766,189
Patented Oct. 16, 1973

3,766,189
FIRE-RETARDANT LATEX CONTAINING
CHLORINATED PARAFFIN WAX
Edward A. Blackford, Jr., Coraopolis, Pa., assignor to
Sinclair-Koppers Company
No Drawing. Filed Oct. 5, 1972, Ser. No. 295,342
Int. Cl. C08d 7/00; C08f 45/28
U.S. Cl. 260—285 B                                    5 Claims

ABSTRACT OF THE DISCLOSURE

A fire retardant polymer composition in latex form has been prepared by adding 5 to 55% by weight based on total monomers of a 30–70% chlorinated paraffin wax and 0.05 to 1.0% by weight based on total monomers of a protective colloid to a monomer mixture comprising 50–90% of an aryl vinyl monomer, 10–50% by weight of a conjugated diolefin, and 0.5–10% by weight of an ethylenically unsaturated carboxylic acid or its amide, and polymerizing the mixture in aqueous acidic emulsion.

BACKGROUND OF THE INVENTION

The present invention relates to a composition of internally plasticized fire retardant latex having improved wet properties and adhesion and to a method for making the latex.

Prior methods of plasticizing a latex have included the addition of the plasticizer, such as dioctyl phthalate, or extenders such as mineral oil, directly to the finished latex while under agitation and allowing the additive to migrate into the polymer particles over a period of time. The major drawback of this method of addition is that the plasticizer is free to migrate out of the polymer during and after the application of the latex in its final use.

It is known to add halogenated hydrocarbons to polymers to impart fire retardancy to the polymers. These additives suffer from the drawback that they adversely effect the adhesion and water resistance properties of the polymers.

It is also known that latexes containing styrene and butadiene are useable as backsizing for textile carpets. For this purpose it is possible to include a carboxylic acid comonomer to add to the bond strength of the latex to the carpet material.

Latex itself, because of the large amount of water in the material, is not too prone to burn. However, when the latex is applied, as for example to a carpet material, and the water has evaporated or been dried off, the resulting film of polymer is especially prone to burning due to the thin cross section of the product.

The demand for self-extinguishing, or fire retardant carpet as for example to meet Federal Specifications for use in public buildings, has created a problem of how to effectively cope with the matter of flameproofing materials having high surface to volume ratio.

SUMMARY OF THE INVENTION

It has now been found that copolymers of aryl vinyl monomers and conjugated diolefins, either alone or in combination with minor amounts of ethylenically unsaturated carboxylic acid compounds or their amides, can be rendered fire retardant and plasticized without loss in physical properties or migration of the plasticizer, by the addition of from about 5 to 55 parts by weight based on monomers of a chlorinated paraffin wax to the emulsion polymerization of the monomers in the presence of 0.05 to 1.0 part by weight of a protective colloid, such as polyvinyl pyrrolidone. The resulting latexes containing the encapsulated chlorinated wax are useful as backsizing for textile carpets and render the carpets fire retardant.

DETAILED DESCRIPTION

The aryl vinyl monomers suitable for use in the present invention are styrene, substituted styrenes such as methylstyrene, dimethylstyrene, ethylstyrene, chlorostyrene, 2,4-dichlorostyrene, 2,5 - dichlorostyrene, and divinyl benzene, $\alpha$-methylstyrene, $\alpha$,p-dimethylstyrene, t-butylstyrene and the like, or mixtures of these compounds.

Examples of conjugated diolefins which may be used are 1,3-butadiene, 2,3-dimethyl-1, 3-butadiene, 2-methyl-1, 3-butadiene (isoprene), 2-chloro-1, 3-butadiene (chloroprene), piperylene and the like.

Ethylenically unsaturated carboxylic acid compounds usable include the mono carboxylic acids such as acrylic acid, methacrylic acid, ethacrylic acid, and crotonic acid and the dicarboxylic acids such as itaconic acid, methyl itaconic acid, maleic acid, fumaric acid, mesaconic acid, citraconic acid and the like, as well as mixtures of these.

Ethylenically unsaturated primary amides usable in the present invention would include acrylamide, methacrylamide, ethacrylamide, crotonamide, itaconamide, methyl itaconamide, maleic acid monoamide, diacetone acrylamide and the like, and their N-methylol derivatives.

These components are emulsion polymerized to form the polymers of the present invention.

In normal emulsion polymerization, a minor amount of an inorganic salt of electrolyte is required. Normally preferred inorganic salts are the chlorides, sulfates, bisulfites, or phosphates of the alkali metals, or alkaline earth metals, such as potassium chloride, trisodium phosphate, tetra-sodium phosphate, sodium hexametaphosphate and sodium chloride.

The use of organic surface-active agents or surfactants is also possible, and the amount used can vary from about 2 to 4 parts per 100 parts of monomer. These organic surfactants enable the formation of a colloidal solution for polymerization. Various surfactants are usable, such as the alkyl aryl sulfonates, organo phosphate esters, sulfated esters of fatty acids, sodium dodecyl diphenyl ether disulfonates, dialkyl esters of succinic acid and other water soluble anionic surfactants. Also, nonionic surfactants are usable such as the alkyl phenyl polyethoxy ethanols, organo silicones, fluoro-carbon surfactants and the like. Particularly advantageous in the present invention is a mixture of the anionic surfactant, sodium dihexylsulfosuccinate and a nonionic surfactant, nonylphenyl polyethylene glycol ether.

In addition to the inorganic salts and organic surfactants, there may also be used, in the polymerization, a chelating agent such as a tetrasodium salt of ethylenediamine tetraacetic acid. These chelating agents are known in the art for use in emulsion polymerization and generally used in an amount of about 0.01 to 1.0 part per 100 parts monomer.

The polymerization catalyst or initiator used to produce the novel latex of the present invention is chosen from the many which serve as a thermally activated source of free radicals, such as the organic peroxides, perbenzoates and persulfates. Preferably, potassium persulfate is used, as it provides efficient reaction rates and gives superior heat ageing characteristics to the resulting latex. The amount of catalyst used is normally about 0.1 to 2.0 parts per 100 parts of monomer, preferably about 0.25 to 0.50 part.

Chain transfer agents may be used in the present inventions to regulate the average molecular weight of the polymer to a usable range. Those preferably used are the long chain alkyl mercaptans such as t-dodecyl mercaptan or tridecyl mercaptans. Other useful chain transfer agents may be used such as the lower alkyl xanthogens, alpha bromoethylbenzene, alpha-chloroethylbenzene and carbon tetrabromide. The amount of chain transfer agent varies according to the activity of the particular agent and is readily determined by one skilled in the art.

The chlorinated paraffin waxes suitable in the invention are normally liquid paraffins containing from 30 to 70% chlorine, such as the chlorinated waxes sold commercially as Chlorowax ® by Diamond Shamrock Chemical Company. The waxes may have a viscosity, as measured at 25° C. on a Brookfield Viscometer, of between 7 and 150 poises. In the present invention, these waves are useful in amounts between 5 and 55% by weight, based on the total monomer charge. The exact amount depends on the degree of chlorination of the particular wax selected and the degree of fire retardancy desired in the resulting polymer mixture. The paraffin waxes are added as a solution in the monomer mixtures.

Also required to obtain the fire retardant latexes of the present invention is the addition of from .05 to 1.0 part of a protective colloid, such as polyvinylpyrrolidone, to encapsulate the chlorinated paraffin in the polymer emulsion. Particularly effective for this purpose is a polyvinylpyrrolidone having a molecular weight of between 10,000 and 160,000. The protective colloid is added as a solution in the surfactant and modifier solutions.

The polymerization is carried out in aqueous acidic emulsion, the amount of water being varied according to the solids content desired in the final latex. Generally preferred is a ratio of water to monomer such that a latex having a total solids content, i.e., copolymer, surfactants and electrolytes, of from about 40–65 percent is produced. The preferred range of solids is from 48–60 percent.

In the process of the present invention, a heel or initial portion of the reactants is charged to the polymerization reactor. The initial charge comprises a portion, about 30–50 percent of the total amount, of the monomers, modifiers and surfactants, and catalyst mixtures. If a lesser amount of the total reactants is charged, less than about 30 percent, the polymerization results in the production of curd, which is undesirable and renders the resulting latex unusable. If too large a portion of the total monomers, greater than about 50 percent is charged, the resulting strong exotherm creates a condition which precludes the formation of the novel latex of the present invention.

This heel portion is then heated to a temperature between 50 and 100° C., preferably 60–80° C., to polymerize the initial monomers. This polymerization is carried out to about 40–50 percent conversion, which is ascertainable by determining the amount of solids formed; this conversion corresponding to a solids content of between 18 and 22 percent.

After the conversion of the initial charge or heel to 40–50 percent conversion, the remainder of the monomers, surfactants, and catalyst are added over a period of time of about four to six hours. During this time, the temperature is maintained at the level used during the initial polymerization, preferably at 60–80° C. After all the reactants have been added, the temperature is raised to between 80 and 90° C. and the polymerization continued until the reaction is complete. This end point is ascertained by determining the amount of solids present (preferably in the order of 45–60 percent) in the latex produced.

Upon the completion of the polymerization, the pH of the latex is adjusted to 8–10, preferably about 9.0, with inorganic or organic bases such as sodium hydroxide, ammonium hydroxide, potassium hydroxide, morpholine, water soluble amines, hydroxylamines, and the like; ammonium hydroxide preferably being used. The residual monomers are then stripped off and the pH of the latex again adjusted to 8–10. After filtration to remove any undesirable insolubles, the latex is ready for use as carpet backing, especially in needlepunch carpeting where increased water resistance, bondstrength and flame retardancy are required.

Methods of measuring the burning or flammability characteristics of styrene-butadiene latex films or coatings have not been highly developed. Various correlations have been attempted between the rates of burning of film strips supported at various angles—horizontally, at 45° incline, and vertically.

One such test, published by the U.S. Dept. of Commerce and entitled "Carpets and Rugs (Pill Test)" as DOC FF 1–70, has been adapted for testing the fire retardant properties of the latexes of this invention. The test is carried out in a box, 12 inches by 12 inches by 12 inches, which is open at the top to provide adequate ventilation and which, at the same time, protects the specimen and the ignition flame from drafts. A steel plate, 9 inches by 9 inches by ¼ inch thick, with an 8 inch diameter hole in its center is used to hold the carpet flat during the course of the test. The ignition media is a Methenamine Timed Burning Tablet (Eli Lilly No. 1588). Eight test specimens, each 9 inches square, are cut from the fabric to be tested and conditioned by placing the specimens for about 2 hours in a circulating air oven set at 105° C. The specimen is then placed quickly into the test chamber, the flattening frame is placed on the specimen and the pill placed in the center of the 8 inch diameter hole. The pill is ignited by touching a match carefully to the edge of the tablet. The flame is allowed to burn until either the last vestige of flame or glow disappears or the flaming or smoldering has approached to within 1 inch of the edge of the hole in the flattening frame. The distance from the edge of the hole in the flattening frame to the nearest point of the charred area is then measured and recorded. If the distance is greater than 1 inch for 7 of the 8 specimens tested, the carpet meets the specifications for fire-retardant carpets.

The invention is further illustrated by, but is not intended to be restricted by, the following examples wherein all parts specified are parts by weight based on total monomer composition.

Example I

To a polymerization reactor, there was charged an aqueous modifier solution containing 41.00 parts of water, 0.90 part of sodium dihexylsulfosuccinate, 0.90 part of nonylphenyl polyethylene glycol ether, 0.025 part of polyvinyl pyrrolidone (molecular weight 40,000), 0.20 part of tetrasodium pyrophosphate, 0.02 part of sodium hexametaphosphate, 0.048 part of tetrasodium ethylenediamine tetraacetate, and 0.38 part of itaconic acid. After purging the reactor with nitrogen, a monomer solution of 28.50 parts of styrene, 9.5 parts of butadiene, 0.08 part of tert-dodecyl mercaptan, and 8.36 parts of a 60% chlorinated paraffin wax was added. The mixture was agitated and heated to 40° C. and a catalyst solution of 0.114 part of potassium persulfate in 6.0 parts of water was added. The reaction mixture was agitated, heated to 75° C., and held at about 75° C. until 20% solids had been formed in the mixture (about 1.25 hours). There was then added in three streams, at a uniform rate during a period of 330 minutes, a first stream comprising an aqueous modifier solution of 38.00 parts of water, 1.50 parts of sodium dihexylsulfosuccinate, 0.04 part of polyvinyl pyrrolidone (molecular weight 40,000), 0.10 part of tetrasodium pyrophosphate, 0.04 part of sodium hexametaphosphate, 0.08 part of tetrasodium ethylenediamine tetracetate, and 0.62 part of itaconic acid; a second stream comprising an oily monomer phase containing 46.50 parts of styrene, 15.50 parts of butadiene, 0.124 part of tert-dodecyl mercaptan, and 13.64 parts of 60% chlorinated paraffin wax, and a third stream comprising a catalyst solution containing 0.186 part of potassium persulfate in 15.00 parts of water. Following completion of the additions, the temperature was gradually raised to 85° C. and held at 85° C. until about 55% solids were present in the reaction mixture. The total reaction time was about 12 hours. The latex was removed and placed in a stripper, neutralized with aqueous ammonia, and the volatiles removed to a monomer content of 0.03% during which time the pH of the latex dropped. Aqueous ammonia was added to give a pH of 9.0 and the mixture filtered to give the latex product having about 55% solids. The final latex had 75 parts of styrene, 25 parts of butadiene, 1 part of itaconic acid, 22 parts of 60% chlorinated paraffin wax, and 0.066 part of polyvinyl pyrrolidone.

Example II

By a procedure essentially the same as that of Example I, three latexes were prepared having the following compositions:

|  | Parts | | |
| --- | --- | --- | --- |
|  | A | B | C |
| Styrene | 65 | 60 | 60 |
| Butadiene | 35 | 40 | 40 |
| Itaconic acid | 1 | 1 | 1 |
| Diacetone acrylamide | 1 | 1 | ---- |
| 60% chlorinated wax | 50 | 50 | [1] 18.75 |
| Polyvinyl pyrrolidone (M.W. 40,000) | 0.075 | 0.075 | 0.066 |
| Percent solids of latex | 51.4 | 50.6 | ---- |

[1] 70% chlorinated paraffin wax.

Example III

The latex designated C, prepared in Example II, was sprayed onto cotton cloth to an extent of 0.3 g./sq. in. (resulting in a composite sample containing approximately 80% by weight of the polymer on the cloth). The cloth was then cut into 2.5 inches by 0.5 inch by $\frac{1}{16}$ inch strips and tested for limiting oxygen index (LOI) by a procedure developed at General Electric Company. The LOI is the lowest percentage of oxygen in the atmosphere which will permit a sample to burn. The cotton cloth blank had an LOI of 18.8% while the sample coated with the latex from Example IIC containing 18.75% of 70% chlorinated paraffin wax had an LOI of 19.5%. This indicated that the latex was an effective flame retardant material. Similar latexes without any wax have been measured to have LOI of between 18.0 and 18.5%.

Example IV

To illustrate the effect of various percentages of chlorinated paraffin wax on the fire retardancy of the latex of the present invention, two latexes were prepared by the procedure of Example I, having 6.25 (designated IIIA) and 12.5% (designated IIIB) of 70% chlorinated paraffin wax. Then several samples of polypropylene needle punch, indoor-outdoor carpeting were spray coated with various latexes containing the amounts of wax as indicated in the Table I at a coat weight of 5–7 oz./sq. yd. (dry weight). The carpet was conditioned as mentioned in the earlier discussion of the "Pill Test" (DOC FF 1–70), and tested for flame retardant properties. The Table I shows the results reported as burn distance (inches from the edge of the hole in the flattening frame to the nearest charred area) and as burn time (time between ignition of the pill and last smoldering of the carpet).

TABLE I

|  | Burn | |
| --- | --- | --- |
| Sample sprayed with | Time (sec.) | Distance (inches) |
| Uncoated carpet | 114.6 | 3.30 |
| Latex of Example: |  |  |
| IIIA (6.25%) | 121.0 | 3.41 |
| IIIB (12.5%) | 107.9 | 3.45 |
| IIC (18.75%) | 105.5 | 3.36 |
| I (22%) | 104.7 | 3.40 |

The shorter the burn time, and the longer the burn distance, the better the flame retardant properties of the latex.

What is claimed is:
1. A process for preparing a fire retardant polymer in latex form comprising:
   (a) forming a monomer solution containing 50–90 parts by weight of an aryl vinyl monomer with correspondingly 50–10 parts by weight of a conjugated diolefin, 0.5–10 parts by weight of an ethylenically unsaturated carboxylic acid or its amide and 5–55 parts by weight, based on total monomers, of a chlorinated paraffin wax having 30–70 percent chlorine;
   (b) forming an aqueous modifier solution containing 2–4 parts based on total monomers of organic surfactant, 0.1–0.5 part based on total monomer of an inorganic salt as electrolyte, 0.01–1.0 based on total monomers of a chelating agent, 0.05–1.0 part based on total monomers of a polyvinylpyrrolidone having a molecular weight of between 10,000 and 160,000 as a protective colloid, and water in an amount to make a latex having from 40–65 percent solids;
   (c) forming an aqueous catalyst solution containing 0.1–2.0 parts of a free-radical producing catalyst per 100 parts of monomer in a 1.5 percent solution in water;
   (d) polymerizing in aqueous acidic emulsion at a temperature of 50–100° C., a heel portion comprising 30–50 percent by weight of said monomer solution, said aqueous modifier solution, and said aqueous catalyst solution to a conversion of 40–50 percent,
   (e) adding over a predetermined period of time, to said heel, at said temperature, the remaining 70–50 percent of the monomer solution, modifier solution, and catalyst solution;
   (f) continuing the polymerization until about 40–65 percent solids is obtained to produce a latex; and
   (g) adjusting the pH of the latex to between 8 and 10.

2. In a process for polymerizing in aqueous acidic emulsion at a temperature of 50–100° C. a monomeric mixture of 50–80 parts per 100 parts mixture of styrene, 10–50 parts per 100 parts mixture of butadiene, and 0.5–10 parts per 100 parts mixture of at least one monomer selected from the group consisting of acrylic acid, methacrylic acid, itaconic acid, fumaric acid, acrylamide, and diacetone acrylamide, the improvement comprising polymerizing said monomeric mixture in the presence of 5–55 parts per 100 parts monomeric mixture of a chlorinated paraffin wax having 30–70 percent chlorine and 0.05–1.0 part per 100 parts monomeric mixture of polyvinyl pyrrolidone having a molecular weight between 10,000 and 160,000.

3. A fire retardant composition prepared according to the process of claim 2.

4. The process of claim 1 wherein said aryl vinyl monomer is styrene, said conjugated diolefin is 1,3-butadiene, said ethylenically unsaturated carboxylic acid is itaconic acid, said chlorinated paraffin wax contains 60 percent chlorine, and said protective colloid is a polyvinyl pyrrolidone having a molecular weight of 40,000.

5. The latex prepared according to the process of claim 1.

References Cited

UNITED STATES PATENTS 3,639,298   2/1972   Lister et al. _____ 260—28.5 B

ALLAN LIEBERMAN, Primary Examiner

S. L. FOX, Assistant Examiner

U.S. Cl. X.R.

260—29.7 GP, Digest 24